United States Patent
Hatscher et al.

(10) Patent No.: US 8,176,047 B2
(45) Date of Patent: May 8, 2012

(54) METHODS AND SYSTEMS FOR LOCATING INFORMATION IN A COMPUTER SYSTEM

(75) Inventors: Michael Hatscher, Osnabruck (DE); Joerg Beringer, Frankfurt (DE)

(73) Assignee: SAP AG, Walldorf (DE)

( * ) Notice: Subject to any disclaimer, the term of this patent is extended or adjusted under 35 U.S.C. 154(b) by 994 days.

(21) Appl. No.: 10/846,669

(22) Filed: May 17, 2004

(65) Prior Publication Data
US 2005/0149506 A1    Jul. 7, 2005

(30) Foreign Application Priority Data

May 16, 2003 (EP) .................................... 03011202
Oct. 17, 2003 (EP) .................................... 03078286

(51) Int. Cl.
*G07F 17/30* (2006.01)
(52) U.S. Cl. ........................................ 707/736; 715/769
(58) Field of Classification Search .................. 707/1, 2, 707/3, 5, 6
See application file for complete search history.

(56) References Cited

U.S. PATENT DOCUMENTS

| | | | | |
|---|---|---|---|---|
| 5,712,995 A | * | 1/1998 | Cohn | 715/792 |
| 5,721,903 A | * | 2/1998 | Anand et al. | 707/5 |
| 5,842,203 A | * | 11/1998 | D'Elena et al. | 1/1 |
| 5,862,395 A | * | 1/1999 | Bier | 712/1 |
| 6,154,756 A | * | 11/2000 | Hearn et al. | 715/236 |
| 6,516,312 B1 | * | 2/2003 | Kraft et al. | 707/3 |
| 7,519,919 B2 | * | 4/2009 | Hatscher et al. | 715/780 |
| 2002/0069122 A1 | * | 6/2002 | Yun et al. | 705/26 |
| 2004/0015309 A1 | * | 1/2004 | Swisher et al. | 702/79 |
| 2005/0004897 A1 | * | 1/2005 | Lipson et al. | 707/3 |

OTHER PUBLICATIONS

Goodwin et al., "Descriptive Search Method and Apparatus for Use in Electronic Commerce," WO/2000/079459, published Dec. 28, 2000.*

* cited by examiner

*Primary Examiner* — Farhan Syed
(74) *Attorney, Agent, or Firm* — Finnegan, Henderson, Farabow, Garrett & Dunner, LLP

(57) ABSTRACT

A computer system includes a user interface. The user interface includes at least one control for inputting at least one search criterion for searching in a database. The user interface also includes a visual result interface for visually outputting the result, at least one control in the visual result interface for selecting at least one element of a result of the searching, and a visual selection interface for at least visually outputting the selection. The visual result interface and the visual selection interface are positioned beside each other. In addition, the computer system includes a processor device communicatively connected to the user interface and connectable to the database. The processor may execute instructions for searching the database with said at least one search criterion, outputting to the user interface a result of the searching, and outputting to the user interface the selection from the result.

8 Claims, 3 Drawing Sheets

METHODS AND SYSTEMS FOR LOCATING INFORMATION IN A COMPUTER SYSTEM

BACKGROUND

This application is based upon and claims the benefit of priority from prior patent application EP 03011202.3 filed May 16, 2003, and prior patent application EP 03078286.6, filed Oct. 17, 2003, the entire contents of each which are expressly incorporated herein by reference.

I. Technical Field

The present invention relates to systems and methods for searching for information in a computer system.

II. Background Information

Computer systems with a user interface may include a control for inputting search criteria. The search criteria can be used by the computer system during a search operation in which data is retrieved from a database. Typically, the result of the search is shown in a visual result interface on a display as a list of items. The user interface also includes controls for a user to select at least one element from the results. The selected results are then displayed in a visual selection interface as a vertical list of items. In such a system, the visual result interface and the visual selection interface are vertically positioned in different positions with respect to each other on the user interface, such as one positioned on top of the other. The visual result interface and visual selection interface are horizontally located at the same position.

However, such a system is not easy to use since as the results and/or the selection of the results increases, and if there is a lot of information displayed for each item, the vertical dimensions of the list will increase. Depending on the vertical size of the display, three may be an insufficient space to display the result and/or the selection simultaneously. In such a system, the visual result interface and visual search interface can be overlapped in the vertical direction to display as much of the results or selection as possible. However, such a solution has the disadvantage that at least a portion of the items of one of the visual interfaces is obscured by the other visual interface and thus is not visible to the user.

SUMMARY

A visual result interface and a visual selection interface are positioned beside each other. The visual interfaces are thus not horizontally positioned in the same position. According, the items, such as the results and the selected items, that are outputted to the visual interfaces are not obscured by the other visual interface when a large number of results and/or the selected of results are numerous.

In addition, in a method according to the present invention, information in each of the visual interfaces is not obscured by the other visual interface because the visual result interface and the visual selection interface are positioned beside each other and not arranged vertically with respect to each other.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

Figure 1:
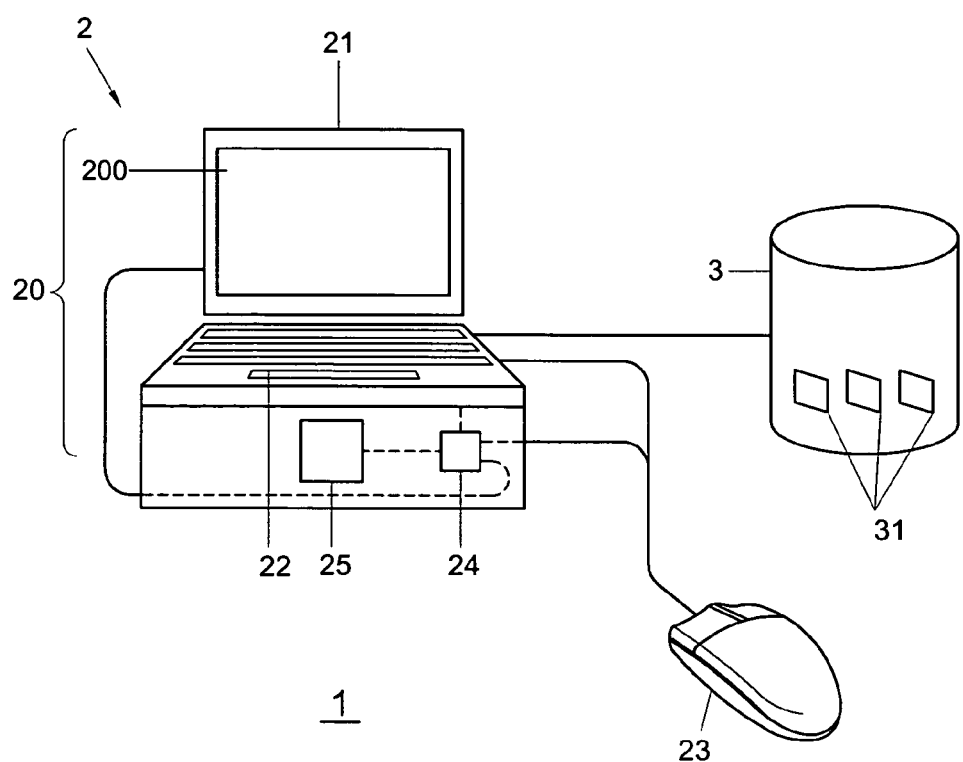
FIG. 1 shows an exemplary embodiment of a computer system according to the invention.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering or adding steps to the disclosed methods. Accordingly, the following detailed description does not limit the invention. Instead, the proper scope of the invention is defined by the appended claims.

FIG. 1 shows an example of computer system 1, including computer device 2, which is communicatively connected to database 3. Objects 31 are stored in database 3. Objects 31 may be, for example, documents in a computerized knowledge-base that describe certain topics. In addition, database 3 may also store other types of information. In FIG. 1, database 3 is located outside of computer device 2 and is communicatively connected to computer device 2, but the database may likewise be positioned inside computer device 2.

Computer device 2 is provided with a user interface (UI) 20, which comprises an output interface, such as display 21, which may display information for a graphical user interface (GUI), at which data can be outputted in a perceivable format to a user. In this example, data can be outputted visually at display 21. User interface 20 further includes an input interface at which the user can input data into computer device 2. In this example, the input interface comprises a keyboard 22 and a mouse 23. Both the output interface and the input interface may comprise other components than those shown in FIG. 1, such as an electronic writing pad, acoustic output or input devices. Furthermore, parts of the input interface and the output interface may at least partially be integrated in the same device, such as a touch-screen.

In the example shown in FIG. 1, computer system 2 further comprises a processor 24, which is communicatively connected to display 21, keyboard 22, mouse 23, and a memory 25, as is shown by lines in FIG. 1. Processor 24 may process input from the input interface, and output data to display 21. Processor 24 may further include other functionality, such as an ability to handle data received or outputted to another device, an ability to manipulate data, or run one or more computer programs stored in memory 25.

Figure 2:
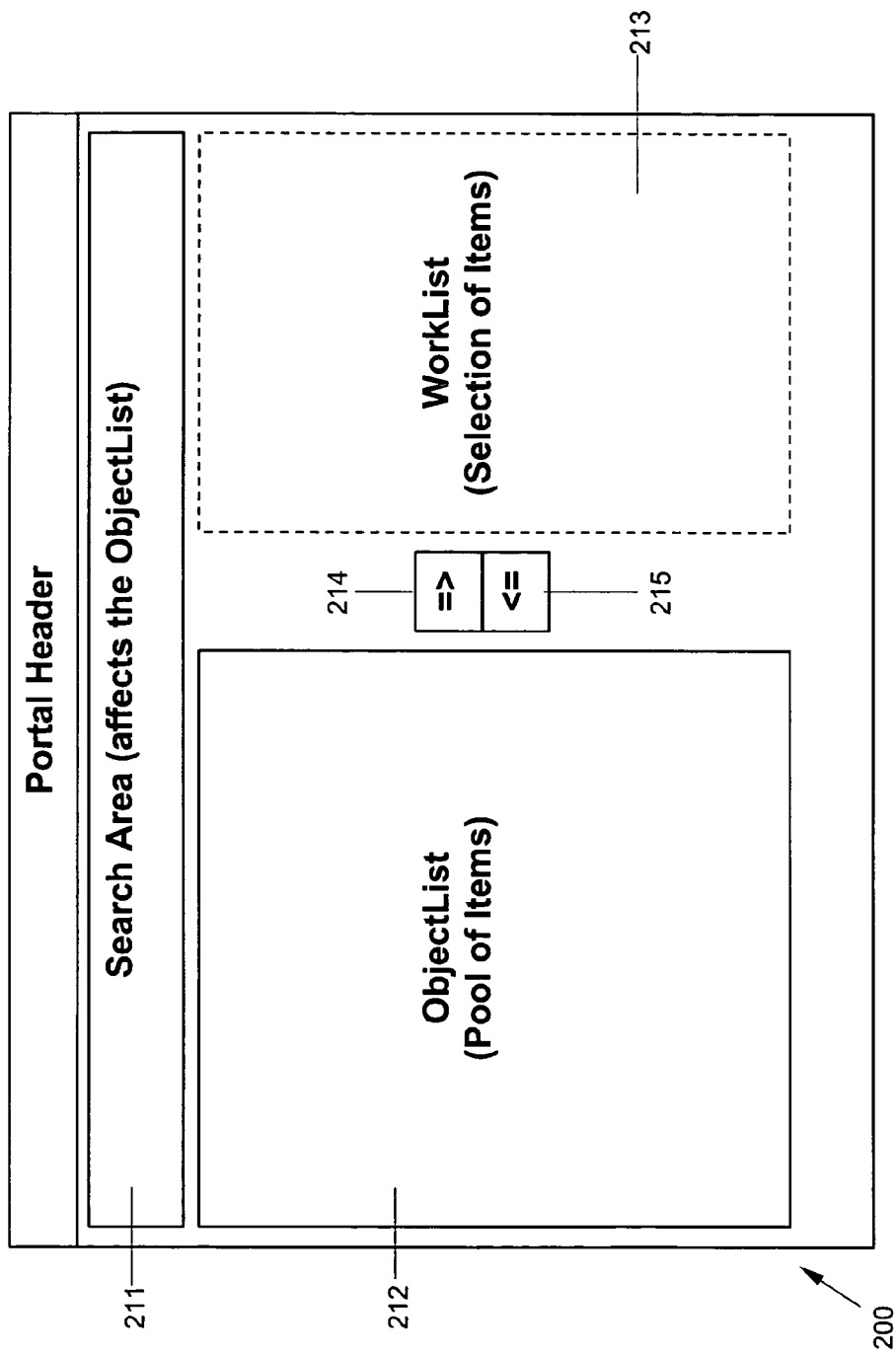
FIG. 2 shows an exemplary embodiment of a user interface suitable for use in the example of FIG. 1.
Figure 3:
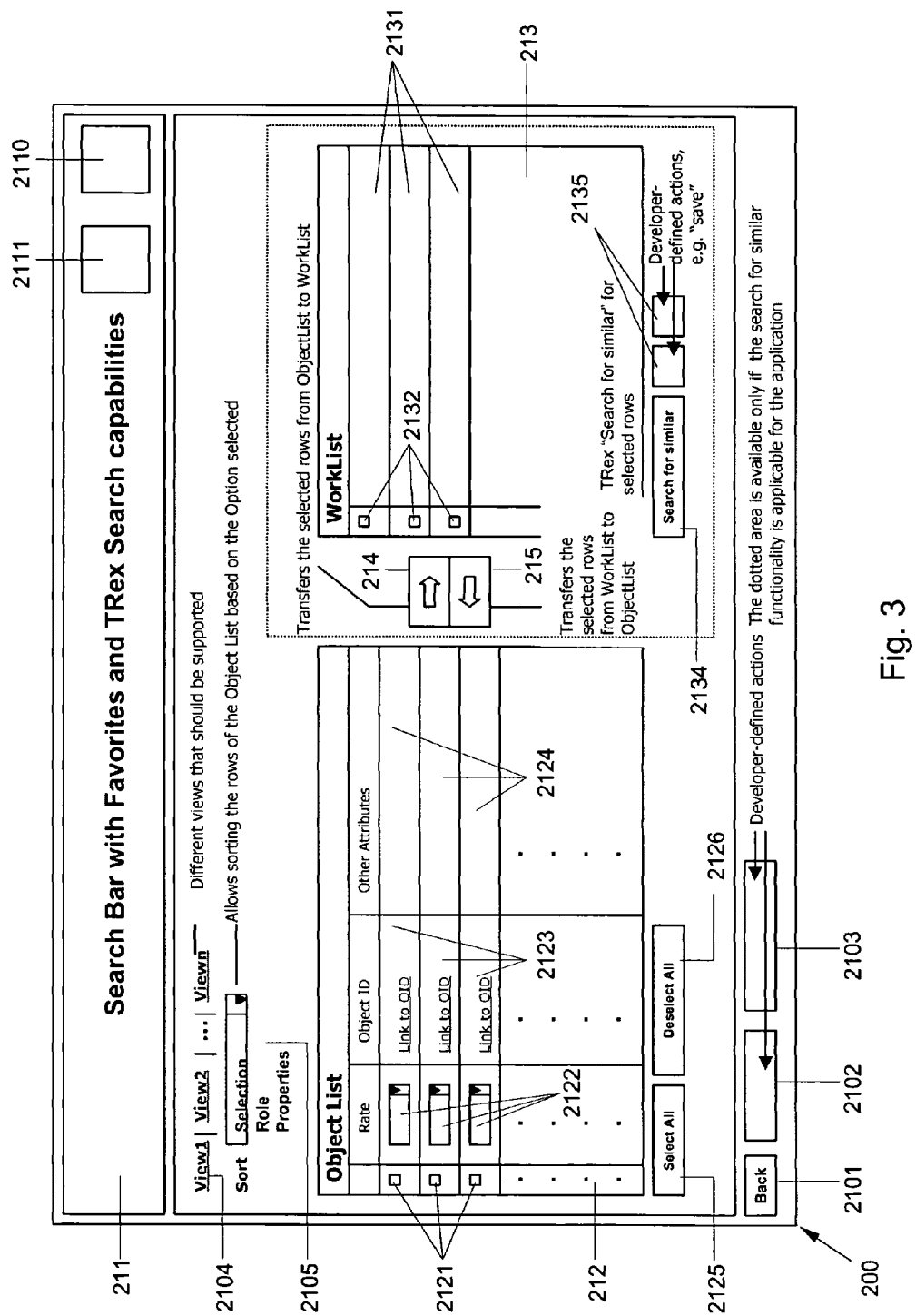
FIG. 3 shows the example shown in FIG. 2 in more detail.

In the example shown in FIGS. 1-3, actions performed by a user by means of keyboard 22 and mouse 23 are graphically represented at the GUI by computer device 2. Thus, in this example, when actions are performed by a user at the GUI, the actions are performed by means of keyboard 22 and mouse 23, but graphically represented at the GUI However, it is likewise possible to combine the GUI and the input interface, for example as a touch-screen. In such an embodiment, actions performed by a user at the GUI are both represented and performed at the GUI.

As shown in FIG. 1, user interface 20 comprises a graphical program interface 200, which provides a visual representation on display 21 of at least a part of a computer program running on computer device 2. The computer program may, for example, provide a user at a node in a computer network with access to resources on a server in the network. In the example shown in FIG. 1, graphical program interface 200 is a graphical representation of a web-browser program which allows access to resources, such as applications, data and services of a computerized enterprise management system, such as the systems provided by SAP AG of Walldorf, Germany. When objects 31 in database 3 are documents describing certain topics, the browser may be one that is provided by SAP AG of Walldorf, Germany under the name "idea browser." The database may then be a so-called "idea pool."

As shown in FIG. 2, graphical program interface 200 has a search control interface 211 that includes a search area for inputting at least one search criterion for searching in database 3. In this example, search control interface 211 comprises a field displayed on display 21 at which the user can enter a search query by means of keyboard 22 and mouse 23. For instance, the search query may comprise one or more search criteria that objects 31 satisfy in database 3. The criteria may be that objects 31 in database 3 must include a certain ID or that objects 31 have properties or attributes that satisfy a certain requirement. For example, if objects 31 are items that comprise information about people working in a company, the criteria may be that the name of a person should begin with a certain character or that the person is assigned a certain function. If objects 31 are text documents describing certain topics or ideas, the criteria may be that the document should relate to a certain product, for example.

Search control interface 211 may be implemented in any suitable way. As shown in FIG. 3, for example, search control interface 211 comprises favorites control 2110 for providing a list of preferred items in database 3. This list may be stored in memory 25 and may be generated automatically based on previous selections of items in the database by the user. Search control interface 211 in FIG. 3 further includes advanced search control 2111, which provides an extensive searching interface and allows for more sophisticated searching, such as provided by the retrieval and classification engine traded under the name TREX by SAP AG of Walldorf, Germany.

Via advanced search control 2111, a user can indicate a search program and open a search interface outside graphical program interface 200. The search program interface allows the user to specify more extensive search criteria and search database 3 for items satisfying the specified criteria. The search interface may also be implemented as a part of graphical program interface 200 and may be a part of search control interface 211.

In the example of FIG. 1, processor 24 is arranged for searching in database 3 with the search criterion and outputting a result of the search at display 21. In response, the result is outputted visually at a visual result interface 212 (FIG. 2) within the graphical program interface in display 21, as an object list. The object list is a list of one or more items identifying one or more objects in database 3 which satisfy the search criteria.

Referring now to FIG. 2, graphical program interface 200 further includes a visual selection interface 213 at which a selection of the items in the visual result interface 212, such as a work list, can be outputted visually. Graphical program interface 200 is provided with a move control 214 for executing a move operation on at least one element of the items listed in visual result interface 212. In this example, the move control 214 comprises a button displayed on display 21, which can be "pressed" by means of mouse 23. In response to pressing the button, selected items in visual result interface 212 are transferred or copied to visual selection interface 213. However, move control 214 may be implemented differently. For example, a user may select one or more items from visual result interface 212 by means of pressing a certain button of keyboard 22, for example. Graphical program interface 200 also has a remove control 215 by means of which selected parts of the results can be removed from visual selection interface 213.

As shown in FIG. 2, visual result interface 212 and visual selection interface 213 are positioned beside each other and are not arranged vertically with respect to each other. Accordingly, the result of the search and the selection can be displayed simultaneously. Even when the number of items in visual result interface 212 or visual selection interface 213 is large, the interfaces do not overlap each other. Thus, none of the items displays in the interfaces are obscured by one another.

As is shown in more detail in FIG. 3, visual selection interface 213 comprises item fields 2131 in which an item of the selection from visual result interface 212 is displayed. The user can select one or more of the items by means of controls 2132. The user may then perform a search in the database for items associated with the selected items, by means of a "search for similar" control 2134. Search for similar control 2134 may invoke an operation performed by processor 24 for searching in database 3 for objects 31, which have properties similar to the selected items. For example, if the items represent text documents, processor 24 may then search for documents related to the same topic or, in case the items represent names of people in a company, processor 24 may search database 3 for other people working in the same department as those selected. The result of this search is then displayed in search result interface 212.

In addition to search for similar control 2134, user interface 20 in FIG. 3 has other controls for activating one or more events associated with at least a part of the selection, which are denoted with reference number 2135 in FIG. 3. For example, user interface 20 may be provided with a control for starting a second computer program associated with one or more of the items according to program code stored in computer system 2. For example, when the selected items are the names of persons, an e-mail program may be started by means of controls 2135 to send e-mails to the selected persons. When the items represent concepts stored in database 3, a text editor program may be started to edit the text. Likewise, the event initiated by means of controls 2135 may be the merging of two or more items into a single item.

In visual result interface 212, the results of the search operation in database 3 are listed as items. In visual result interface 212, object identification data (OID) is shown as well as other attributes of the items in fields 2124. In FIG. 3, object identification data 2123 is provided with a control, for example, a hyperlink, by means of which information about an item can be retrieved and displayed, as indicated in FIG. 3 by underlined text. Also, a rating is outputted in a rating field 2122 that provides information about the amount of correspondence and its accuracy in relation to the one or more search criteria and the listed item or items.

As shown in FIG. 3 with reference numbers 2121, 2123, 2125 and 2126, visual result interface 212 may also be provided with controls. In FIG. 3 for example, select control 2121 is provided by means of which the user can select one or more items listed in visual result interface 212. Also a "select all" control 2125 is provided by means of which the user can select all items in visual result interface 212. In addition, a user may transfer the items to visual selection interface 213 by means of the move control 214. Using "deselect all" control 2126, the user can deselect all selected items.

Graphical program interface 200 is further provided with a sort control 2105 by means of which the results can be sorted, such as in alpha-numeric order of their object IDs, the rating outputted in rating fields 2122, or in another fashion. Interface 200 is also provided with view controls 2104 by means of which a different view can be outputted on the display. Also, return control 2101 is present via which the user can return to a previous search or other browser window. Other controls may also be provided, as is shown in FIG. 3 by controls 2102, 2103, which includes a save control via which the user can store the results of a search and search criteria in a memory of the computer system, for example. The user can also save personalized lists of selected search results, which can later be used as starting points for further exploration of the idea pool or for searches for similar items, for example.

The computational aspects described here can be implemented in digital electronic circuitry, or in computer hardware, firmware, software, or in combinations of them. Where appropriate, aspects of these systems and techniques can be implemented in a computer program product tangibly embodied in a machine-readable storage device for execution by a programmable processor, and method steps can be performed by a programmable processor executing a program of instructions to perform functions by operating on input data and generating output.

The invention may also be implemented in an article of manufacture with a computer-usable medium having computer-readable instructions embodied therein for providing access to resources available on that computer, the computer-readable instructions comprising instructions to cause the computer to perform the steps of a method according to the invention. The invention may also be implemented as a computer program for running on a computer system, at least including code portions for performing steps of a method according to the invention when run on a computer system or enabling a general propose computer system to perform functions of a filter device according to the invention. Such a computer program may be provided on a data carrier, such as a CD-ROM or diskette, stored with data loadable in a memory of a computer system, the data representing the computer program. The data carrier may further be a data connection, such as a telephone cable or a wireless connection transmitting signals representing a computer program according to the invention.

While certain features and embodiments of the invention have been described, other embodiments of the invention will be apparent to those skilled in the art from consideration of the specification and practice of the embodiments of the invention disclosed herein. Furthermore, although embodiments of the present invention have been described as being associated with data stored in memory and other storage mediums, one skilled in the art will appreciate that these aspects can also be stored on or read from other types of computer-readable media, such as secondary storage devices, like hard disks, floppy disks, or a CD-ROM, or other forms of RAM or ROM. Further, the steps of the disclosed methods may be modified in any manner, including by reordering steps and/or inserting or deleting steps, without departing from the principles of the invention.

It is intended, therefore, that the specification and examples be considered as exemplary only, with a true scope and spirit of the invention being indicated by the following claims and their full scope of equivalents.

What is claimed is:

1. A computer device comprising:
a database connection for accessing a database containing objects;
a user interface including a display device for displaying a graphical program interface, the graphical program interface comprising:
   a search control for receiving at least one search criterion for searching the objects in the database to obtain at least one first result object;
   a visual result interface for displaying the at least one first result object as at least one result data record having a plurality of fields;
   a result selection control for selecting at least one of the at least one result data record;
   a visual selection interface for displaying the selected result data record at the visual selection interface, wherein the visual result interface and the visual selection interface are horizontally positioned beside each other; and
   a Search Similar control for:
      searching the database for objects with properties similar to at least one of the selected at least one result data record displayed at the visual selection interface
      obtaining at least one second result object different from the at least one first result object; and
      displaying the at least one second result object at the visual result interface; and
a processor device coupled to the user interface and to the database connection, wherein the processor device executes instructions for searching in the database with the at least one search criterion, outputs to the visual result interface the result data record of the searching, and outputs to the visual selection interface the selected result data record,
wherein the result data record in the visual result interface is displayed in a same format as the selected result data record in the visual selection interface.

2. The computer device of claim 1, wherein the user interface further comprises at least one control for activating at least one event associated with at least one element of the selection.

3. The computer device of claim 2, wherein the event comprises at least one of:
searching the database for items associated with at least one element of the selection; or
initiating by the processor steps according to program code stored on the computer system.

4. The computer device of claim 1, wherein the visual result interface comprises a control for opening a computer program associated with at least one of the selected at least one result data record.

5. The computer device of claim 1, further comprising a favorites control for displaying at least one predetermined list of preferred items in the visual result database.

6. A computerized searching method, comprising:
providing, at a user interface, a control for receiving at least one search criterion for searching in a database;
searching the database with the at least one search criterion to obtain at least one first result object;

displaying, at a visual result interface of the user interface, the at least one first result object as at least one result data record having a plurality of fields;

providing, at the user interface, a control for selecting at least one of the at least one result data record;

receiving a user input to select the at least one of the at least one result data record;

displaying the selected result data record at a visual selection interface of the user interface, wherein the visual result interface and the visual selection interface are horizontally positioned beside each other;

searching the database, with a Search Similar control of the user interface, for objects with properties similar to at least one of the selected at least one result data record displayed at the visual selection interface, the Search Similar control obtaining at least one second result object different from the at least one first result object; and displaying the at least one second result object at the visual result interface, wherein the result data record in the visual result interface is displayed in a same format as the selected result data record in the visual selection interface.

7. A non-transitory computer-readable storage medium storing instructions tangibly embodied therein for providing access to resources available on a computer, the computer-readable instructions comprising instructions to cause the computer to perform the steps of a method comprising:

providing, at a user interface, a control for receiving at least one search criterion for searching in a database;

searching, using a processor, the database with the at least one search criterion to obtain at least one first result object;

displaying, at a visual result interface of the user interface, the at least one first result object as at least one result data record having a plurality of fields;

providing, at the user interface, a control for selecting at least one of the at least one result data record;

receiving a user input to select the at least one of the at least one result data record;

displaying, at the visual result interface, the selected result data record at a visual selection interface of the user interface, wherein the visual result interface and the visual selection interface are horizontally positioned beside each other; and searching the database, using a Search Similar control of the user interface, for objects with properties similar to at least one of the at least one selected result data record displayed at the visual selection interface, the Search Similar control obtaining at least one second result object different from the at least one first result object; and displaying the at least one second result object at the visual result interface, wherein the result data record in the visual result interface is displayed in a same format as the selected result data record in the visual selection interface.

8. The computer device of claim 1, wherein the graphical program interface includes an output select control for selecting the selected result data record displayed in the visual selection interface.

* * * * *